United States Patent
Kurniady

(10) Patent No.: US 11,231,698 B2
(45) Date of Patent: Jan. 25, 2022

(54) METHOD AND SYSTEM FOR CONTROLLING A MACHINE TOOL

(71) Applicant: SIEMENS AKTIENGESELLSCHAFT, Munich (DE)

(72) Inventor: Andreas Kurniady, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 177 days.

(21) Appl. No.: 16/776,083

(22) Filed: Jan. 29, 2020

(65) Prior Publication Data
US 2020/0241510 A1 Jul. 30, 2020

(30) Foreign Application Priority Data

Jan. 30, 2019 (EP) .................................... 19154528

(51) Int. Cl.
*G05B 19/418* (2006.01)

(52) U.S. Cl.
CPC ... *G05B 19/41825* (2013.01); *G05B 19/4183* (2013.01); *G05B 19/4188* (2013.01); *G05B 19/41885* (2013.01)

(58) Field of Classification Search
CPC .......... G05B 19/41825; G05B 19/4183; G05B 19/4188; G05B 19/41885
USPC ....................................................... 700/169
See application file for complete search history.

(56) References Cited

U.S. PATENT DOCUMENTS

| 4,718,001 | A | | 1/1988 | Wetzel | |
|---|---|---|---|---|---|
| 5,363,026 | A | * | 11/1994 | Currat | G05B 19/4141 318/569 |
| 2004/0138776 | A1 | | 7/2004 | Baumann et al. | |
| 2005/0209712 | A1 | * | 9/2005 | Sagasaki | G05B 19/4093 700/28 |
| 2007/0046677 | A1 | * | 3/2007 | Hong | G05B 19/41 345/442 |
| 2009/0125142 | A1 | * | 5/2009 | Bauer | B24B 51/00 700/164 |
| 2010/0004760 | A1 | * | 1/2010 | Endo | G05B 19/4155 700/13 |

(Continued)

FOREIGN PATENT DOCUMENTS

| DE | 103 43 809 A1 | | 4/2004 |
|---|---|---|---|
| DE | 10343809 | * | 4/2004 |
| EP | 0 184 736 A1 | | 6/1986 |

*Primary Examiner* — Hien D Khuu
(74) *Attorney, Agent, or Firm* — Henry M. Feiereisen LLC

(57) ABSTRACT

A method for controlling a machine tool includes processing a parts program by executing non-cyclic preprocessing run tasks and cyclic main run tasks, two master values resulting from the executed preprocessing run tasks are stored in a first buffer memory. A first part of a curve table is generated, which includes a first specification that assigns to a first one of the master values a first coupling value for a coupling axis. The respective cycle of the main run tasks to which the first master value is assigned is then executed, whereafter a second part of the curve table is executed, which includes a second specification that assigns a second coupling value for the coupling axis to a second one of the master values. The second part is stored in the second buffer memory. Considerable savings in time and memory are achieved.

13 Claims, 2 Drawing Sheets

(56) References Cited

U.S. PATENT DOCUMENTS

2013/0103180 A1* 4/2013 Tolkmitt ............ G05B 19/4061
700/114
2015/0323923 A1* 11/2015 Takabe ................ G05B 19/19
700/186

* cited by examiner

METHOD AND SYSTEM FOR CONTROLLING A MACHINE TOOL

CROSS-REFERENCES TO RELATED APPLICATIONS

This application claims the priority of European Patent Application, Serial No. 19154528.4, filed Jan. 30, 2019, pursuant to 35 U.S.C. 119(a)-(d), the content of which is incorporated herein by reference in its entirety as if fully set forth herein.

BACKGROUND OF THE INVENTION

The present invention relates to a method for controlling a machine tool with which a parts program is processed by executing non-cyclic preprocessing run tasks and cyclic main run tasks. Herein, two master values are stored in a first buffer memory as the results of the preprocessing run task. Each of the master values corresponds to a respective position for a master axis, wherein each of the positions is assigned to a respective cycle of the main run tasks. The invention furthermore relates to a computer program, a computer-readable storage medium and a control system for performing such a method and a machine tool with a computer program of this kind, computer-readable medium or control system for carrying out the method.

The following discussion of related art is provided to assist the reader in understanding the advantages of the invention, and is not to be construed as an admission that this related art is prior art to this invention.

When machining a workpiece with a machine tool, it can be desirable for a first buffer memory, in particular an interpolation buffer, to be as full as possible on the commencement of the main run tasks. This, for example, enables it to be ensured that the machining can take place with the desired movement path and enables the avoidance of machining downtime or delays, which can occur when the main run tasks are carried out more quickly than the results of the preprocessing run tasks are subsequently delivered.

However, there are applications in which, for example, the preparation of a numerical control block in a preprocessing run task takes more time than that required to carry out the prepared block in a main run task. For example, this can be the case with unfavorable capacity utilization of the numerical control, in particular a processor of the numerical control system or when the description of the workpiece in the parts program requires a comparatively high number, in particular relatively short, numerical control blocks. In such a case, the machining speed may be reduced.

It would therefore be desirable and advantageous to obviate prior art shortcomings and to provide an improved control of a machine tool, in particular a numerically controlled machine tool, that enables the reduction in machining speed to be limited or avoided.

SUMMARY OF THE INVENTION

The improved control is based on the idea of using a buffered curve table and performing cycles of the main run with the aid of individual sections of the curve table. Herein, the curve table is initially only partially stored in a second buffer memory and then loaded step-by-step according to the machining status of the main run.

According to one aspect of the present invention, a method for controlling a machine tool, in particular a computer-implemented method, in particular a numerically controlled machine tool is disclosed. With the method, a parts program is processed by executing non-cyclic preprocessing run tasks and cyclic main run tasks. Herein, two master values are stored in a first buffer memory as the results of the preprocessing run tasks, wherein each of the master values corresponds to a respective position for a master axis and each of the positions, and hence in particular each of the master values is also assigned to a respective cycle of the main run tasks.

According to the method, a first part of a curve table is generated, wherein the first part of the curve table includes a first specification that assigns a first coupling value for a coupling axis to a first one of the master values. The first part of the curve table is stored in a second buffer memory. Then the cycle of the main run tasks is executed that is assigned to the first master value, and in particular the first position, wherein the execution takes place based on the first master value and the first coupling value. Following the execution of the cycle to which the first master value is assigned, the first specification is discarded. In particular the specification is deleted from the second buffer memory. When the specification has been discarded, a second part of the curve table is generated, wherein the second part of the curve table includes a second specification that assigns a second coupling value for the coupling axis to a second one of the master values. Then, the second part of the curve table is stored in the second buffer memory.

Here, and in the following, a machine tool should be understood to be a machine for manufacturing a workpiece with a tool, the movement of which relative to each other is controlled by the machine. Herein, the machine tool can in particular be embodied as a turning machine or milling machine, a robot, an industrial robot, a rotating robot or milling robot. The machine tool can also be embodied as a machine for additive manufacturing, wherein the tool can, for example, incorporate a laser source or a laser head or a nozzle for applying material.

Here, and in the following, a task should be understood to mean a data processing step or a plurality of successive data processing steps or data processing steps that are associated in another way that are performed by a processor or a processor unit or a system of processors, in particular by a plurality of processors in parallel or in series.

The parts program is in particular an NC parts program, wherein "NC" stands for "numerical control". The parts program can in particular be written in a standardized machine code, for example in a G-code. The first master value corresponds to a first position for the master axis, wherein the first position is assigned to a first cycle of the main run tasks. The second master value corresponds to a second position for the master axis, wherein the second position is assigned to a second cycle of the main run tasks. Reference is made to the fact that in this context "first" or "second" is only used to differentiate the master values, positions and cycles etc. In particular, the second cycle does not have to follow the first cycle directly. In addition, the first position does not necessarily correspond to a position that is adopted first in terms of time by the master axis, nor does the first cycle necessarily correspond to a cycle that is processed first in terms of time.

The master axis can be an axis assigned to a linear or rotational movement of the machine tool. The same applies with respect to the coupling axis. The coupling axis, or coupling values can also be referred to as the slave axis or slave values. The master axis and the coupling axis, for example guided by the master axis, can be controlled for the machining of the workpiece. The master and coupling axes can be machine axes, i.e. real, for example physical, axes of the machine. Alternatively, they can be virtual axes.

The parts program includes, for example, a multiplicity of numerical control blocks (hereinafter "NC blocks") each of which is assigned to a movement of one or more axes. The NC blocks include, for example, descriptions of the workpiece geometry and associated process data, for example machine data, tool data and/or feed data, in particular feed rates.

The preprocessing run tasks prepare the NC blocks. In particular, they are prepared such that they can be processed by a NC control system, in particular an interpolation module or interpolator, in particular by executing the main run tasks. During the main run tasks, each of the prepared NC blocks is executed, for example in an associated cycle. The execution of a main run task can, for example, incorporate the generation of one or more control commands for actuating a tool.

The main run tasks are cyclic tasks, indicating that they are executed cyclically. In other words, the multiplicity of main run tasks can be executed in a fixed sequence one after the other. Herein, for example, the main run tasks have a higher priority than the preprocessing run tasks. The main run tasks can, for example, have clock pulse periods with an order magnitude of one or more ms, for example 1 to 5, in particular 1 to 3 ms.

The preprocessing run tasks are non-cyclic tasks. This can mean that the preprocessing run tasks are not necessarily executed in real time. In particular, the preprocessing run tasks have a lower priority than that of the main run tasks. As a result, the preprocessing run tasks are, for example, performed when the corresponding processor capacity is available, in particular, when the processor capacity is not fully utilized by the main run tasks.

The preprocessing run tasks can, for example, encompass tasks for interpreting the parts program, in particular the NC blocks of the parts program, for example by means of an interpreter. The preprocessing run tasks can, for example, encompass a preparation of the NC blocks interpreted by the interpreter, for example by a preparer.

The main run tasks can, for example, encompass interpolation of the prepared NC blocks, in particular by means of an interpolator. The main run tasks can, for example, include position control, in particular of axes, for example the master and/or the coupling axis based on the prepared and interpolated NC blocks.

As results of the preprocessing run tasks, the two master values are, for example, explicitly or implicitly included in the associated prepared NC blocks in each case.

The curve table can, for example, be understood as a virtual cam, in particular as a substitute for a mechanical cam. Since the curve table includes specifications that assign the position and/or speed values to the master axis, i.e. master values, position and/or speed values to the coupling axis, i.e. coupling values, in particular in the form of functional relationships between the master and coupling values, it enables the NC control, with appropriate programming, for example to calculate a polynomial corresponding to the cam from the mutually assigned master and slave values.

For example, the parts of the curve table can be files or file sections, which are present in the form of floating-point numbers. In particular, the curve table can be a file or file sections that can be read by the interpolator.

The generation of the curve table, in particular the part of the curve table, encompasses, for example, the preparation of a position file, which includes positional relationships of the workpiece, for processing the positional relationships during the main run tasks, in particular by means of the interpolator. The position file can, for example, be present in a character format, in particular an ASCII format. The position file is, for example, a parts program that is specially required for this purpose.

The first buffer memory can, for example, be an interpolation buffer since it can hold the prepared NC blocks for further processing, for example by means of the interpolator. The first buffer memory can, for example, correspond to a first region of a storage element.

The second buffer memory is in particular a heap memory or heap buffer. The heap memory, can for example, correspond to a second region of the storage element or a further storage element.

In addition to the specification that assigns the first coupling value to the first master value, the first part can incorporate a multiplicity of further specifications for further master values. In particular, the first part of the curve table can include so many further specifications that the second buffer memory or a defined portion of the second buffer memory is full when the first part of the curve table is stored therein.

The further part of the curve table can, for example, incorporate only one further specification, namely the one that assigns the second coupling value to the second master value. However, the second part of the curve table can also additionally include further specifications. In particular the second part of the curve table includes so many specifications that memory space of the second buffer memory that has been released as a result of the discarding of the specification for the first master value is filled.

The first part of the curve table is in particular not a complete curve table that includes specifications for assigning coupling values to master values for all cycles of the main run tasks.

Reference is made to the fact that the described steps of the method do not necessarily all have to take place in chronological order. It is only necessary for steps of the method that are explicitly or implicitly in a logical relationship to one another to be carried out in the corresponding order. Method steps, which are based on the results of other method steps are, therefore, carried out after these. In particular, the generation of the part of the curve table may only take place after the execution of corresponding preprocessing run tasks. Storage of the part may only take place after the generation of the part, the execution of the cycle to which the first master value is assigned may only take place after the generation and storage of the part of the curve table and so forth. In particular, the generation of the further part of the curve table, which includes a further specification that assigns the second coupling value to the second master value, can only take place after the generation of the part of the curve table, storage of the part of the curve table, execution of the cycle to which the first master value is assigned and the discarding of the specification that assigns the first master value to the first coupling value.

The use of the curve table enables a substantial part of the preparation of the NC blocks to be decoupled from the actual machining by the main run tasks. In particular, the computational effort for the preprocessing run tasks is decisively reduced by the use of the curve table. The result of this is that the preparation of the NC blocks by the preprocessing run tasks has a lower influence or no longer has any influence on the machining speed by the main run tasks because, for example, the first buffer memory is always full or substantially full. Therefore, delays with the main run tasks or even machining downtime is avoided.

Decoupling the generation of the curve table from the preprocessing run tasks does not result in any delays in the preprocessing run tasks such as can, for example, be the case with compression of the NC blocks.

Moreover, it is not necessary for the NC blocks to be interpreted with high tolerances, such as can, for example, be the case when compression methods are used.

The fact that the curve table is only loaded step-by-step and stored in the second buffer memory means that the improved control only uses a fraction of the memory space that would be required if the entire curve table were stored completely in a buffer memory. For example, the first part of the curve table can correspond to less than 50%, for example an order of magnitude of 10% of the entire curve table, which is accompanied by a corresponding reduction in the memory requirement. This can in particular be advantageous if the heap memory is a high-performance memory component that possibly may not be available with the desired capacity. The lower memory requirement enables, for example, the manufacture of workpieces with higher accuracy or larger workpieces, since this is accompanied by a higher total number of NC blocks in each case.

Due to the step-by-step generation and storage of the curve table, it is only necessary to store the first part of the curve table before the commencement of the main run tasks in the second buffer memory. The further parts of the curve table can then be loaded continuously or parallel to the execution of the main run tasks. As a result, the total time required for the machining is reduced compared to known approaches with which no curve table is used. This is in particular the case because the generation of the position file only takes a relatively short period of time. In addition, overall there is a significant reduction in the time required compared to conceivable approaches with which the entire curve table is loaded in the second buffer memory in one go because, effectively, due to the parallel generation, the other parts of the curve table do not prolong the total machining time.

All the steps in the different embodiments of the method can optionally be performed by a computer system or a computer, in particular a numerical control. In such embodiments, the execution incorporates a main run cycle, for example the generation and optionally outputting of control commands, which can control mechanical components of a machine tool in order to initiate an actual tool movement.

According to at least one embodiment of the method, the generation of the part of the curve table that includes the specification for the first master value incorporates reading positional relationships based on geometric properties of a workpiece to be manufactured from a position the and preparation of the positional relationships in order to obtain the specification that assigns the first coupling value to the first master value.

Herein, the preparation of the positional relationships can incorporate the fact that the positional relationships are brought into a functional relationship between the master value and the coupling value, i.e. the master value is depicted as a mathematical function of the coupling value. In particular, the preparation can include the conversion of the positional relationships and/or of the functional relationship into a form or format that is accessible to interpolation, which therefore, can in particular be processed by interpolation, for example by means of the interpolator.

The generation of the further part of the curve table that includes the further specification for the second master value takes place similarly. This also applies to all further parts of the curve table.

According to at least one embodiment, the method additionally incorporates the execution of the cycle of the main run tasks to which the second master value is assigned based on the second master value and the second coupling value.

As described for the execution of the cycle to which the first master value is assigned, the discarding of the further specification and the generation and storage of further parts of the curve table and the execution of the further cycles of the main run tasks can be repeated periodically until all the cycles of the main run tasks have been executed and the manufacture of the workpiece is accordingly completed.

Therefore, the second buffer memory is filled in one go completely or in a specific predetermined amount by the part of the curve table relating to the first master value and then taught and re-described step-by-step only.

According to at least one embodiment, the execution of the cycle to which the first master value is assigned incorporates the generation of at least one control command to control a tool of the machine tool.

According to at least one embodiment, in order to act physically on the workpiece, the tool is guided based on the at least one control command.

According to at least one embodiment, the at least one control command incorporates a control command for a position controller for changing a position of the master axis or coupling axis, a control command for a speed controller to control a tool or workpiece speed and/or a control command to control a motor controller, in particular a current controller, for example to control a feed rate.

Similar control commands can be generated by the execution of further cycles and other, in particular all the other, cycles of the main run.

According to at least one embodiment, the method incorporates conversion of the at least one control command that incorporates movement of the tool or guidance of the tool in order to manufacture the workpiece.

According to at least one embodiment, the generation of the at least one control command incorporates interpolation based on the first master value and the first coupling value.

The interpolation incorporates, for example, the calculation of a route of a corresponding NC block and movements or displacements of the coupling axis and/or master axis required therefor so that the tool is guided along a corresponding mathematically definable path in order to manufacture the workpiece.

A controller or software module that performs the interpolation is called, for example, an interpolator. For the interpolation, the interpolator accesses the first and the second buffer memory in order to read the first master value and the associated first coupling value.

According to at least one embodiment, the method additionally incorporates generating the parts program in dependence on geometric properties of the workpiece to be manufactured and process data for manufacturing the workplace.

The geometric properties of the workpiece incorporate, for example, nominal dimensions and/or tolerance values for the workpiece.

The process data can, for example, include machine data, machine parameters, tool data, tool parameters, tool or workplace speeds or feed rates.

According to at least one embodiment, the generation of the parts program includes the generation of NC blocks.

The NC blocks are in particular generated based on the geometric properties of the workpiece and the process data.

According to at least one embodiment, the execution of the preprocessing run tasks includes compression of the numerical control blocks.

The compression can, for example, be performed by a software or control module, called a compressor.

The compression combines, for example, two or more NC blocks to form longer NC blocks, which can effect a quicker execution of preprocessing run tasks.

According to an aspect of the improved control, a control system for a machine tool is disclosed. The control system comprises a first buffer memory, a second buffer memory, a processor unit and an input interface for receiving a parts program. The control system is configured to receive the parts program via the input interface and process it by executing non-cyclic preprocessing run tasks and cyclic main run tasks by means of the processor unit and to store two master values as results of the preprocessing run tasks in the first buffer memory by means of the processor unit. Each of the master values corresponds to a respective position for a master axis, wherein each of the positions is assigned to a respective cycle of the main run tasks.

The control system is also configured to generate a part of a curve table by means of the processor unit and store it in a second buffer memory, wherein the part includes a specification that assigns a first coupling value for a coupling axis to a first one of the master values. The control system is configured to execute the cycle of the main run tasks by means of the processor unit to which the first master value or the position corresponding to the first master value is assigned based on the first master value and the first coupling value. The control system is further configured to delete the specification from the second buffer memory after the execution of the cycle by means of the processor unit and to generate a further part of the curve table and store it in the second buffer memory. The further part of the curve table includes a further specification that assigns a second coupling value for the coupling axis to a second one of the master values.

According to at least one embodiment of the control system, the control system includes a NC control that is able to carry out the named steps that the control system can carry out.

According to at least one embodiment, the control system includes a construction system, for example a CAM system, for generating the parts program.

According to at least one embodiment, the control system includes a first storage element that includes the first buffer memory. The control system also includes a second storage element, different from the first one, that includes the second buffer memory.

According to at least one embodiment, the control system includes a storage element, which includes the first and the second buffer memory.

The storage element, the first and/or the second storage element can, for example, be embodied as a random-access memory, RAM, in particular as a dynamic random-access memory, DRAM.

The control system can receive the parts program via the input interface, for example from the construction or CAM system.

According to at least one embodiment, the control system is additionally configured, for the execution of the cycle to which the first master value is assigned, to generate a control command to control the tool. The control system also comprises an output interface to output the control command.

According to yet another aspect of the improved control, a computer program is disclosed. The computer program incorporates commands, which, when the program is run by a computer, in particular by a control system according to the improved control, prompt it to carry out a method for controlling a machine tool according to the improved control.

Herein, the computer or the control system can also comprise more than one computer or processor unit for executing different commands of the computer program.

The named computer can carry out different embodiments of the method according to the improved control completely without requiring further apparatuses therefor.

The machine tool or the control system incorporates for example the computer. In particular, the computer can be the processor unit of a control system according to the improved control.

Also disclosed is a computer program that incorporates commands that cause the control system to perform specific steps of the method and the control system to prompt the machine tool to perform other steps, for example incorporating the movement or actual guidance of the tool.

According to still another aspect of the improved control, a machine tool is disclosed. The machine tool is embodied such that it is able to carry out, in particular does carry out, a method according to the improved control.

The machine tool can, for example, incorporate a control system and/or a computer program and/or a computer-readable medium in each case according to the improved control.

A control system according to the improved control can, for example, incorporate a computer program and/or a computer-readable storage medium according to the improved control.

Further embodiments of the control system can be directly derived from the different embodiments of the method for controlling the machine tool and vice versa. In particular, a control system according to the improved control is configured to perform the method, for example it performs the method. Further embodiments of the machine tool can be directly derived from the different embodiments of the method and the different embodiments of the control system and vice versa in each case.

Exemplary embodiments of the invention are explained in more detail in the following with reference to schematic drawings. In the figures the same or functionally similar elements have been provided with the same reference characters.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
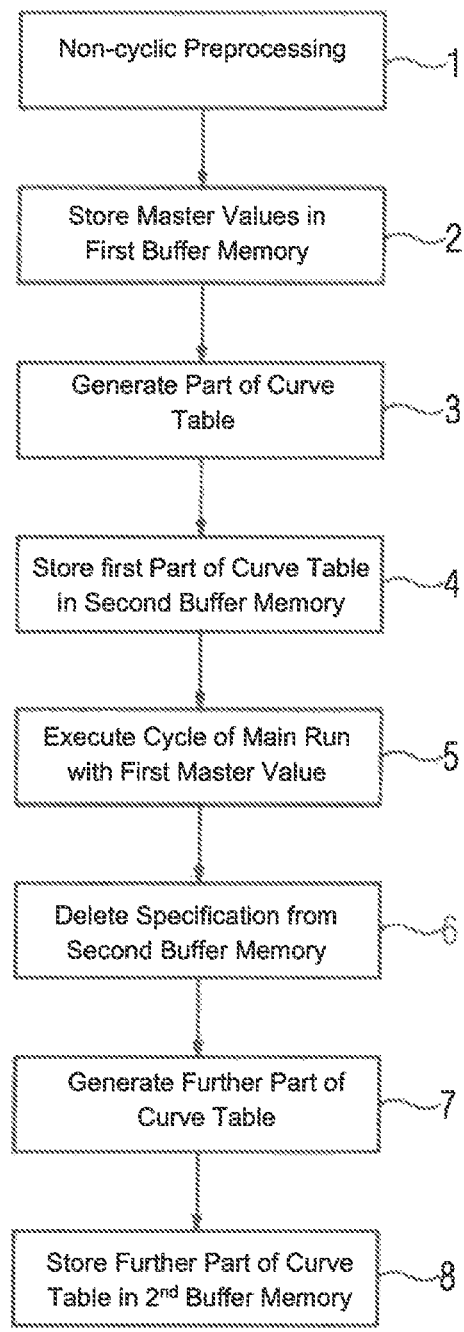
FIG. 1 shows a flow diagram of an exemplary embodiment of a method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic flow diagram with an exemplary control sequence according to the present invention.

In a step 1, non-cyclic preprocessing run tasks of a parts program are executed in order to manufacture a tool. A result of the preprocessing run tasks encompasses, in implicit or explicit form, two master values. In a step 2, the two master values are stored in a first buffer memory. Herein, each of the master values corresponds to a respective position for a master value of a machine tool. A first position of the master axis corresponds to a first master value of the two master values and a second position of the master axis corresponds to a second master value of the master axis. The first and the second position, and hence the first and the second master value, are in each case assigned to a cycle of main run tasks.

In a step 3, a part of a curve table is generated. The part of the curve table includes a specification that assigns a first coupling value for a coupling axis of the machine tool to the first master value. In a step 4, the first part of the curve table is stored in a second buffer memory.

In a step 5, the cycle of the main run to which the first master value, i.e. the first position, is assigned is executed. The execution takes place using the first master value and the first coupling value assigned thereto by the specification.

In a step 6, the specification that assigns the first coupling value to the first master value is discarded, i.e. deleted from the second buffer memory. The deletion releases memory space in the second buffer memory. In a step 7, a further part of the curve table is generated, wherein the further part includes a further specification. The further specification assigns a second coupling value for the coupling axis to the second master value. In a step 8, the further part of the curve table is stored in the second buffer memory, in particular the released part.

Figure 2:
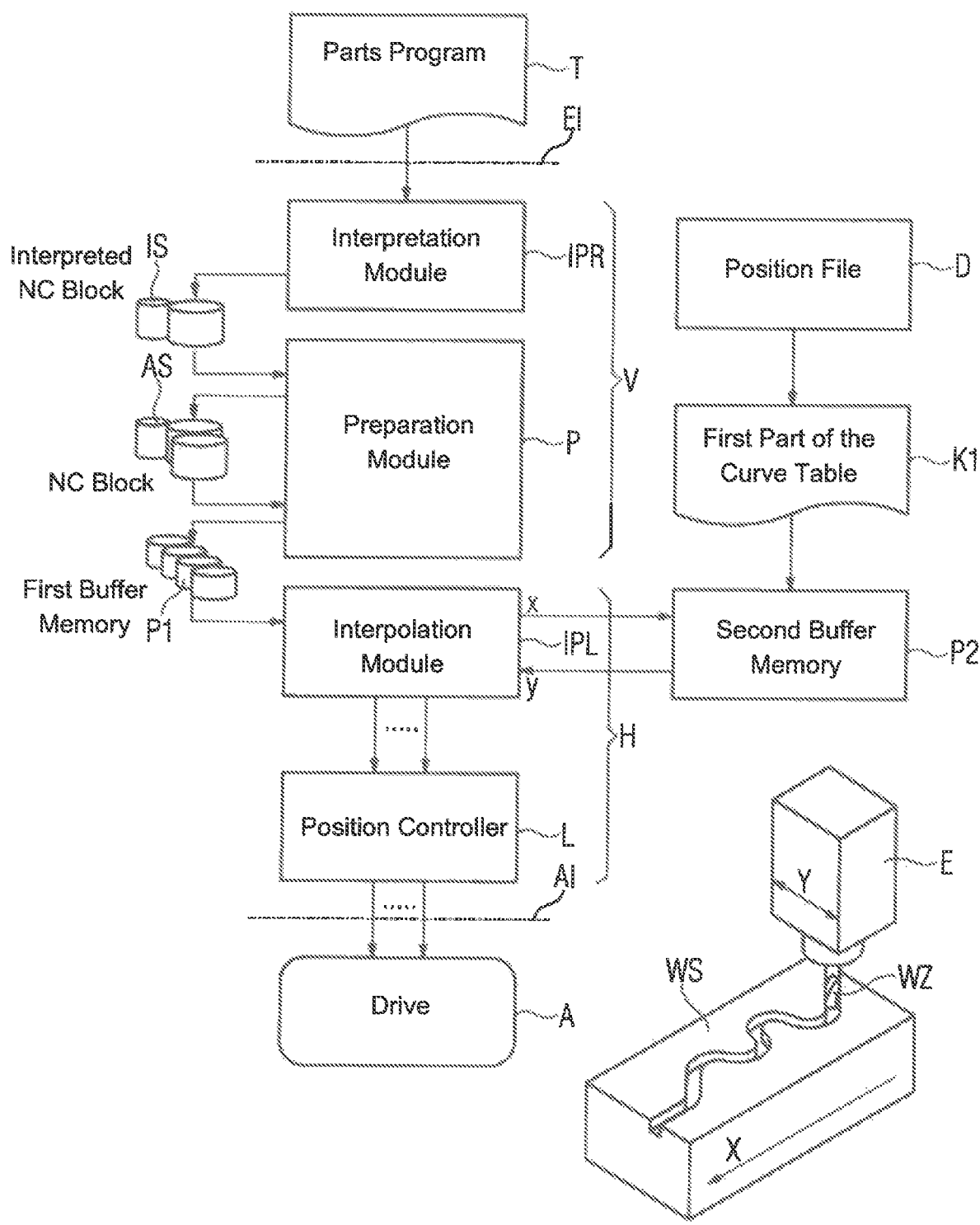
FIG. 2 shows schematically additional exemplary embodiments of a control system and a method according to the present invention.

FIG. 2 shows schematically additional exemplary embodiments of a control system and a method according to the present invention. A parts program T generated, for example, by a CAM system is provided. The parts program T can, for example, be provided in a G-Code or another standardized machine code. The parts program T describes a workpiece WS for machining by a machine tool, schematically depicted by an end element E of the machine tool. The generation of the parts program T can, for example, take place offline on a PC, in particular the CAM station, or another user interface. The parts program T describes a workpiece geometry and, for example, associated process data such as, for example, machine data, tools or feed rate. This description is structured in the form of NC blocks in the parts program T.

Each NC block can, for example, include target values, in particular target speeds and/or target positions of one or more axes of the machine tool, rates of movement for one or more of the axes or, for example, information on interpolation, i.e. the geometrically or mathematically describable path to be taken by the axis to the target values, for example at straight line, a circle section, etc.

To manufacture the workpiece WS, the parts program T is, for example, loaded into the control system via an input interface EI of the control system or transmitted thereto. For example, the parts program T can be transferred to an interpretation module IPR of the control system. The interpretation module IPR can, for example, be used to translate the NC blocks of the parts program T for further processing by the control system. For example, the interpretation module IPR can translate an NC block into different regions which can be assigned to a geometry of the workpiece WS, kinematic process properties such as feed rate and so forth.

As a result, the interpretation module IPR can, for example, generate interpreted NC blocks IS. The interpreted NC blocks IS can then, for example, be transferred to a preparation module P of the control system. The preparation module P can, for example, be used to prepare, in particular simplify or transform, the interpreted NC blocks IS. The preparation can include different geometric interpretations, compressions, resurfacing calculations and the like. The preparation can also include dynamic operations such as transformations or look-ahead operations.

As the result, the preparation module P for example supplies prepared NC blocks AS. The prepared NC blocks AS can be stored in a first buffer memory P1, called an interpolation buffer.

The data processing steps, which are performed by the interpretation module IPR or the preparation module P, are called preprocessing run tasks V.

The prepared NC blocks AS include, in particular in implicit or explicit form, master values x corresponding to positions of a master axis X of the machine tool. The master values x in particular incorporate a first and a second master value.

For example, the control unit generates a first part K1 of a curve table independently of the preprocessing run tasks V. The first part K1 includes a specification, in particular a functional mathematical relationship, which assign a first coupling value for a coupling axis Y of the machine tool to the first master value. Herein, coupling values y correspond to positions of the coupling axis Y. Therefore, the first part K1 of the curve table represents, for example, a control function that defines positional relationships in functional form between the master axis X and the coupling axis Y. The first part K1 of the curve table is stored in a second buffer memory P2, in particular a heap memory.

In order to generate the first part K1 of the curve table, the control system can read, for example, positional relationships based on geometric properties of the workpiece WS, from a position file D, in particular an ASCII file. The positional relationships are then prepared in order to obtain the specification that assigns the first coupling value to the first master value.

The control system can, for example, include an interpolation module IPL, called an interpolator. The interpolation module IPL can in particular read the first master value from the first buffer memory P1 or determine this based on the prepared NC blocks AS stored in the first buffer memory P1. Furthermore, the interpolation module IPL can access the second buffer memory P2 and can determine the assigned first coupling value for the first master value from the second buffer memory P2 using the specification in the first part of the curve table K1.

The interpolation module IPL can use the first master value and first coupling value obtained in this way to calculate a movement and, for example, actuate a position controller L of the control system based on the calculated movement. On the basis of this, the position controller L can in turn generate at least one control command and output this to the machine tool, for example via an output interface AI.

In particular, the at least one control command can be output to one or more drives A of the machine tool. The drives A of the machine tool are for example configured, based on the at least one control command, to guide the end element E, in which a tool WZ can be clamped, so that the tool WZ can machine the workpiece WS.

After the generation of the at least one control command by the control system, the specification for assigning the first coupling value to the first master value is no longer needed. Therefore, this specification is deleted from the second buffer memory P2. This releases memory space in the second buffer memory P2. Correspondingly, similarly to the generation of the first part of the curve table, a second part K2 of the curve table is generated, in particular based on the position file D, and stored in the second buffer memory P2. The second part K2 of the curve table includes a further specification that assigns a second coupling value for the coupling axis Y to the second master value.

The fact that the second part K2 of the curve table is only generated and stored in the second buffer memory P2 when the first specification has been discarded and deleted from the second buffer memory P2 reduces the memory requirement in respect of the second buffer memory P2. The total time required to manufacture the workpiece is also reduced since it is not necessary to wait for the entire curve table to be prepared before the execution of the main run tasks H is commenced by the interpolator IPL and the position controller L.

Similarly to the description with respect to the cycle of the main run tasks H to which the first master value is assigned, the cycle to which the second master value is assigned is also executed, for example. This execution also takes place in particular by means of the interpolation module IPL and the position controller L based on the second master value and the second coupling value. The same also applies to further steps. For example, after the execution of the corresponding cycle, the further specification is also discarded and deleted from the second buffer memory P2.

The process is continued in accordance with the scheme described; a third part, a fourth part, and so forth, of the curve table are generated step-by-step and stored in the second buffer memory P2 in each case. The corresponding cycles of the main run tasks H are executed using the corresponding master and coupling values, which are assigned to one another by the corresponding parts of the curve table; control commands are output to the machine for the guidance of the end element E by the control system.

The described step-by-step generation of the parts of the curve table can achieve a significant reduction in the memory requirement of the second buffer memory P2. A size, i.e. a memory capacity, of the second buffer memory P2 is substantially determined by a memory requirement of the first part K1 of the curve table. In specific applications, the memory requirement of the first part K1 can correspond to a fraction of the memory requirement of the entire curve table. For example, the memory requirement of the first part K1 is within the range of about 5% to about 30%, for example about 10%, of the memory requirement of the entire curve table. Hence, the so-to-speak missing 70 to 90% of memory requirement can be saved herewith.

There is also a comparable saving with respect to the total machining time required to manufacture the workpiece. However, in this case, it should be noted that the step-by-step generation and storage of the curve table does not have any significant influence on the time required for the main run tasks H, however it is possible to reduce the time requirement by computing steps before the main run, by the said approximately circa 70 to 90%, according to the size of the first part K1 of the curve table. Since the time required to perform the main run tasks H is of the same order of magnitude as, in particular comparable to, the time required for all the computing steps that have to be performed by the control system before the commencement of the main run, it is also possible to achieve a significant time saving here as well.

The main run tasks H are cyclic tasks. This means a cycle of the main run tasks H is performed and executed for each machining step, i.e. for each separate movement of the end element E of the machine tool and the corresponding generation of the control commands by the control system. The duration of the cycles is in the ms range, for example within the range of 10 ms or less. For example, the interpolation module IPL can work with a clock pulse with an order of magnitude of two to five ms, for example 3 ms. The position controller L can, for example, work with a clock pulse with the order of magnitude of 1 ms.

The preprocessing run tasks V, in particular computing operations of the interpretation module IPR and the preparation module P, are performed in a non-cyclic manner. This means that the preprocessing run tasks V are performed with a lower priority than the main run tasks H. If there is free processor capacity in the control system, for example because main run tasks H are not fully utilizing the available processor capacity, preprocessing run tasks V can be performed.

According to the improved concept, programs or computing operations for preparing the NC blocks, in particular for generating the master values, are separated from one another in terms of time and also with respect to the process paths from programs or computing operations for preparing the curve table, i.e. In particular the assignment of the coupling values to the corresponding master values. According to the improved concept, it is easier to achieve an optimum condition for carrying out the machining and performing the main run tasks, in particular an interpolation buffer that is always full if possible. This can in particular avoid any possible machining downtime.

The improved concept enables the NC blocks in the preprocessing run tasks to be prepared more quickly than it takes to carry them out in the main run tasks. For this, the load on preprocessing run is reduced to a certain extent by the curve table and the step-by-step generation thereof. This advantage of the invention is particularly evident when, for various reasons, the workpiece can only be described with relatively short NC blocks. In known methods for controlling a machine tool, it is namely in this case that the preparation of the NC blocks sometimes takes more time than that required to carry them out in the main run. Reasons why the workpiece can only be described with relatively short NC blocks encompass, for example, a requirement for a workpiece to have a particularly smooth or homogeneous surface. This necessitates very accurate scanning of the surface and a correspondingly large number of individual machining steps with defined positional relationships.

In particular the step-by-step generation of the curve table or the individual parts of the curve table achieves the described time saving. If the curve table were generated and stored completely in one go, this would only result in the time being shifted from the preprocessing run tasks to the preparation of the curve table. This advantage is in particular noticeable in situations when the machine tool does not always machine identical workpieces but also machines individual workpieces in series.

Since known NC control systems only have a limited heap memory, the described saving of memory is particularly advantageous. This makes it possible to avoid, at least partially, any restriction of the size of the workpiece or the accuracy of the achievable geometry.

An example of an application with which the advantage of the improved concept is particularly noticeable is the machining spectacle lenses. During machining of spectacle lenses, each lens is typically described by more than 100,000 short NC blocks. Since every spectacle lens is different, the corresponding curve table is different for each spectacle lens. It is therefore necessary to generate an individual curve table for each lens. The generation of the curve table in parallel with the main run according to the improved concept enables machining of a spectacle lens to be reduced to, for example 35 s, or less. By way of comparison, the complete preparation of the curve table in one go in such a case, would for example take about 75 s. On the other hand, the step-by-step generation of the curve table according to the improved concept is of no significance for the overall machining process.

A further example can be non-circular turning of a workpiece. Herein, a non-circular workpiece is machined with a turning machine. For this, a very large number of support points are required in a curve table. To achieve the necessary accuracy, it may, for example, be necessary to have two support points for each angular degree resulting in 720 support points for each rotation. In the case of a workpiece with a length of 500 millimeters and a required resolution of 0.1 millimeters, the curve table would require 3.6 million support points. This quantity of data would be unmanageable with a curve table that was generated in one step in respect of the memory requirement and the preparation time. However, the improved concept can make such types of machining possible.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for controlling a machine tool, comprising:
    processing a parts program by executing non-cyclic preprocessing run tasks and cyclic main run tasks;
    storing two master values resulting from the executed non-cyclic preprocessing run tasks in a first buffer memory, wherein each of the two master values corresponds to a respective position for a master axis, with each of the respective positions being assigned to a respective cycle of the cyclic main run tasks;
    generating a first part of a curve table, wherein the first part of the curve table includes a first specification that assigns a first one of the two master values to a first coupling value for a coupling axis;
    storing the first part of the curve table in a second buffer memory;
    based on the first master value and the first coupling value, executing the respective cycle of the cyclic main run tasks to which the first master value is assigned;
    after execution of the respective cycle of the cyclic main run tasks, discarding the first specification and generating a second part of the curve table, wherein the second part of the curve table includes a second specification that assigns a second coupling value for the coupling axis to a second one of the two master values; and
    storing the second part of the curve table in the second buffer memory.

2. The method of claim 1, wherein the generation of the first part of the curve table comprises:
    reading, from a position file, positional relationships based on geometric properties of a workpiece to be manufactured; and
    executing the positional relationships in order to obtain the first specification that assigns the first coupling value to the first master value.

3. The method of claim 1, further comprising, based on the second master value and the second coupling value, executing the respective cycle of the cyclic main run tasks to which the second master value is assigned.

4. The method of claim 1, wherein execution of the respective cycle of the cyclic main run tasks to which the first master value is assigned comprises generating at least one control command for controlling a tool of the machine tool.

5. The method of claim 4, wherein generating the at least one control command comprises an interpolation based on the first master value and the first coupling value.

6. The method of claim 1, wherein the parts program is generated depending on
    geometric properties of a workpiece to be manufactured; and
    process data for manufacturing the workpiece.

7. The method of claim 6, wherein generation of the parts program comprises generation of numerical control blocks.

8. The method of claim 7, further comprising compressing the numerical control blocks when the preprocessing run tasks are executed.

9. A control system for a machine tool, comprising a first buffer memory, a second buffer memory, a processor unit and an input interface, wherein the processor unit is configured to
    process a parts program by executing non-cyclic preprocessing run tasks and cyclic main run tasks;
    store two master values resulting from the executed non-cyclic preprocessing run tasks in the first buffer memory, wherein each of the two master values corresponds to a respective position for a master axis, with each of the respective positions being assigned to a respective cycle of the cyclic main run tasks;
    generate a first part of a curve table, wherein the first part of the curve table includes a first specification that assigns a first one of the two master values to a first coupling value for a coupling axis;
    store the first part of the curve table in the second buffer memory;
    based on the first master value and the first coupling value, execute the respective cycle of the cyclic main run tasks to which the first master value is assigned;
    after execution of the respective cycle of the cyclic main run tasks, discard the first specification and generate a second part of the curve table, wherein the second part of the curve table includes a second specification that assigns a second coupling value for the coupling axis to a second one of the two master values; and store the second part of the curve table in the second buffer memory.

10. The control system claim 9, which is additionally configured, to generate a control command to control a tool for executing the respective cycle of the cyclic main run tasks to which the first master value is assigned, the control system further comprising an output interface to output the control command.

11. A computer program embodied in a non-transitory computer-readable storage medium and comprising commands, which when the computer program is executed by a processor unit of a control system, prompts the processor unit to
- process a parts program by executing non-cyclic preprocessing run tasks and cyclic main run tasks;
- store two master values resulting from the executed non-cyclic preprocessing run tasks in a first buffer memory, wherein each of the two master values corresponds to a respective position for a master axis, with each of the respective positions being assigned to a respective cycle of the cyclic main run tasks;
- generate a first part of a curve table, wherein the first part of the curve table includes a first specification that assigns a first one of the two master values to a first coupling value for a coupling axis;
- store the first part of the curve table in a second buffer memory;
- based on the first master value and the first coupling value, execute the respective cycle of the cyclic main run tasks to which the first master value is assigned;
- after execution of the respective cycle of the cyclic main run tasks, discard the first specification and generate a second part of the curve table, wherein the second part of the curve table includes a second specification that assigns a second coupling value for the coupling axis to a second one of the two master values; and
- store the second part of the curve table in the second buffer memory.

12. A non-transitory computer-readable storage medium on which the computer program as claimed in claim 11 is stored.

13. A machine tool comprising a control system having a first buffer memory, a second buffer memory, a processor unit and an input interface, wherein the processor unit is configured to
- process a parts program by executing non-cyclic preprocessing run tasks and cyclic main run tasks;
- store two master values resulting from the executed non-cyclic preprocessing run tasks in the first buffer memory, wherein each of two master values corresponds to a respective position for a master axis, with each of the respective positions being assigned to a respective cycle of the cyclic main run tasks;
- generate a first part of a curve table, wherein the first part of the curve table includes a first specification that assigns a first one of the two master values to a first coupling value for a coupling axis;
- store the first part of the curve table in the second buffer memory;
- based on the first master value and the first coupling value, execute the respective cycle of the cyclic main run tasks to which the first master value is assigned;
- after execution of the respective cycle of the cyclic main run tasks, discard the first specification and generate a second part of the curve table, wherein the second part of the curve table includes a second specification that assigns a second coupling value for the coupling axis to a second one of the two master values; and
- store the second part of the curve table in the second buffer memory.

\* \* \* \* \*